US006490088B1

United States Patent
Rosen et al.

(10) Patent No.: US 6,490,088 B1
(45) Date of Patent: Dec. 3, 2002

(54) OPTICAL SYSTEM USING A RADIAL HARMONIC PUPIL FILTER FOR GENERATING COLLIMATED BEAMS

(75) Inventors: Joseph Rosen, Pasadena; Amnon Yariv, San Marino; Boaz Salik, Pasadena, all of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 08/592,556

(22) Filed: Jan. 26, 1996

(51) Int. Cl.$^7$ .............................. G02B 27/42; G02B 5/18

(52) U.S. Cl. ..................... 359/558; 359/562; 359/9; 359/29; 385/124

(58) Field of Search ........................... 359/9, 558, 559, 359/562, 29; 385/117, 124; 372/32

(56) References Cited

U.S. PATENT DOCUMENTS

| 4,887,885 A | * 12/1989 | Durnin et al. ............... 359/559 |
| 5,245,619 A | * 9/1993 | Kronberg ..................... 372/32 |
| 5,336,875 A | * 8/1994 | Ono et al. ................... 359/558 |
| 5,370,643 A | * 12/1994 | Krivoshlykov et al. ..... 385/117 |

OTHER PUBLICATIONS

Elementary Differential Equations., Berg et al. p. 333, Holden–Day.*

* cited by examiner

Primary Examiner—Audrey Chang

(57) ABSTRACT

A Fourier hologram with the distribution of a radial harmonic function creates, in the far field, a pseudo non-diffracting beam. The properties of this pseudo non-diffracting beam can be set by appropriate characterization of the radial harmonic function. Various operations can also be carried out to change the position of the beam relative to the focal point. The beam can be shifted in space, twisted, or tilted.

4 Claims, 11 Drawing Sheets

OPTICAL SYSTEM USING A RADIAL HARMONIC PUPIL FILTER FOR GENERATING COLLIMATED BEAMS

STATEMENT OF GOVERNMENT RIGHTS

This invention was funded by the U.S. Army Research Office and the Advanced Research Projects Agency. The government may have certain rights in this invention.

FIELD OF THE INVENTION

The present invention relates to an optical system which generates light beams having special properties at the output of an optical system. More specifically, the optical system of the present invention uses a special kind of radial harmonic function, preferably formed on a Fourier hologram, to produce a non-diverging beam in its far field.

BACKGROUND AND SUMMARY OF THE INVENTION

Optical systems often have many important and diverse applications. Lasers, for example, allow a beam of light to be projected to a precise location, still maintaining a high intensity.

It is a common inaccurate belief that a laser emits a collimated or non-diffracting beam. In actuality, while the beam is more collimated than light from an ordinary lamp, in fact the laser beam is a Gaussian beam. The Gaussian beam diverges according to the rule that the spread angles are related to the wavelength of the light divided by the minimal lateral width of the beam. The Rayleigh distance $\Delta z$, or non-diffracting beam width of this Gaussian is expressed as:

$$\Delta z \propto \frac{w^2}{\lambda}$$

where w is the initial beam width and $\lambda$ is the wavelength. This equation shows that reducing the initial width of the beam actually increases the spreading of the beam.

One aspect of the present invention avoids these phenomena by producing a beam which has better non-diffracting characteristics than a laser beam. The resulting beam has pseudo-non-diffracting properties, which is to say that the beam does not diffract over a defined interval. A pseudo non-diffracting beam ("PNDB") behaves as a non-diffracting beam only in the sense that, in contrast to a Gaussian beam, its peak intensity remains almost constant along an axial interval—its "length". The beam full width in half maximum ("FWHM") increases much more slowly than expected from an ordinary Gaussian beam.

This is coupled with another problem which the inventors recognized as existing in the art. When a plane wave crosses a simple spherical lens, that plane wave is focused to the lens' front focus. The distance between the front focus and the lens is called the focal length. The focal point is on the optical axis of the lens, which is usually an axis that is parallel to the light rays, and that passes through the center of the lens.

A simple lens produces an output which has a bell-curve-shaped intensity profile along the optical axis. Such a system would show a strong intensity precisely at the focal point. That intensity falls off rapidly on both sides of the focal point. A lens can be used to focus the information onto the focal point. However, even a slight deviation from the distance of the focal point will cause results which vary greatly from that desired. In a typical optical system, this results in a sharp image at the focal point, and a blurred image off the focal point.

The width of the bell curve-shaped intensity profile at the output of a lens is sometimes called the depth of focus of the lens. Some lens systems allow wider depths of field, making it easier to stay within the focal point of the lens. Various techniques are known for increasing the depth of focus.

The output characteristics of an optical system are defined according to the so-called point spread function. This point spread function tells us about the output of the system when there is a point at the input. The information is calculated by convolving the input function i with the function h. For a normal point spread function, the output is sharp and clear in the imaging plane.

It is one objective of the present invention to change the ordinary behavior of light when it passes through a lens and optical system to form a pseudo-non-diffracting beam—essentially a very wide depth of focus. The present invention defines an optical system that has a filter in the path of the light prior to the lens. The overall optical system forms a pseudo-non-diffracting beam over a specified position. Put another way, the present invention allows obtaining a very long point spread function.

The term "sword beam" as used in this specification refers to a beam that maintains a constant intensity along a defined optical axis for an arbitrary interval. The lateral width at any cross section of the sword beam is substantially the same as that of the focused beam from an ordinary lens.

It is known that the depth of field of an optical system can be increased by placing an aperture with a narrow ring at the rear focal plane of the lens. See, for example, T. Durnin, JOSA A 4651 (1987). FIG. 1 shows a schematic of that system. That rear focal plane is located at a focal distance from the lens, but on the same side of the lens from which the light arrives.

This system, however, has a number of drawbacks. Only a very small portion of the light passes through the narrow ring and becomes useful at the front focus. Most of the energy of the light is absorbed by the opaque regions of the mask. This results in an extremely inefficient optical system.

Others have suggested preprocessing the optical energy using a Fresnel plate. However, each section of the Fresnel plate has a different frequency. The plate is not radially symmetric, causing certain problems in the output.

For instance, when such a plate is used as a spatial filter of an imaging system, the quality of the output image will be different from one radial direction to another. That is because the output image is obtained from a convolution between the input image and a non-symmetric point spread function (the Fourier transform of the spatial filter distribution). Another example is producing a long narrow tunnel in some material by using a beam emerged from such a plate. The lateral cross section of the tunnel will not be radially symmetric if the beam is not radially symmetric.

Another suggestion has used an alternate technique to provide a desired output. The iterative technique defines constraints of the input and output domains, expresses the distances between the two by an error function, and iteratively finds a hologram that minimizes the error under the constraints. The iterative technique is described, for example, in J. Rosen; A. Yariv; "Synthesis of an arbitrary axial field profile by Computer-Generated Holograms", Optics Letters, Vol 11, #19, pp. #843–845.

Certain of these suggestions have been made by the present inventors, so no admission is made herein that this iterative technique is, in fact, prior art.

It is an object of the present invention to provide a totally new solution to these problems, using a completely new technique. A preferred technique of the present invention uses a special mask at the rear focal plane of the lens. This mask has a light-altering function formed thereon. This function is preferably a radial harmonic function, and more preferably a phase-only function, e.g., a radial harmonic function of the 4th order or greater. The optical system forms a desired pseudo non-diffracting beam having desired characteristics at a specified position. That position can be the front focal point of the lens or other positions. The properties of the sword beam can be controlled using various parameters of the filter.

The inventors have found that a radial harmonic function of the fourth order produces substantially improved effects since virtually no light is absorbed by the mask. A 4th order harmonic system operates as a phase-only filter to change the wave's phase distribution when it passes through the filter. Other techniques, including other orders of radial harmonic function, however, can also be used. More generally, any approximate solution to the ideal Bessel function can be used, and preferably a solution made using the known mathematical theory of stationary phase approximation.

The method of stationary phase approximation is a mathematical technique to solve (approximately) integrals of the form $\int_a^b f(t)\exp[jk\mu(t)]dt$. The method is based on the fact that for a large k the significant contribution to the integral result comes from the area under the function $f(t)\exp[jku(t)]$ around the stationary points. A stationary point $t_o$ is the point where the derivative of $\mu(t)$ is zero. For example, if $\mu'(t_o)=0$, but $\mu''(t_o) \neq 0$ and $t_o$ is the only stationary point inside the interval [a,b], the integral is approximately equal to $$\int_a^b f(t)\exp[jk\mu(t)]dt \approx f(t_0)\exp[jk\mu(t_0)]\sqrt{\frac{2\pi}{k\mu''(t_0)}}\exp(j\pi/4).$$

More details about this method are described in: A. Papoulis, *Systems and transforms with applications in optics*, Ch. 7, 222–254, (McGraw-Hill 1968).

The present invention also describes techniques which change the original radial harmonic function to shift the sword beam within the optical space, even tilting it by up to 20° from the optical axis and/or changing the position relative to the focal point. These shifting techniques allow the focal line for the light to be modified in any desired way.

Another aspect of the invention makes use of the shifting technique to allow the focal line to be a line of any desired shape. The inventors have titled this arbitrary-shaped focal line a "snake beam".

The sword beam has important applications in imaging systems and/or in any application where a laser is or can be used. The output of an imaging system is an observed object which is located at the input plane. Its image is obtained at the image plane. If the image is observed at a distance away from the image plane, it looks out of focus—it looks like a blurred image of the original object.

The radial harmonic filter system of the present invention keeps the image pattern in focus for a longer distance—a distance equal to the length of the pseudo non-diffracting beam. Since this beam is shaped like a sword, it is sometimes called a sword beam. This system effectively increases the focal length of the imaging system. This technique has many applications as described herein.

A well-known telescopic system can be used according to the present invention. This system uses two lenses, one behind the other, with a common focal plane. When the image is placed in the rear focal plane of the first lens, the image plane becomes the front focal plane of the second lens. The radial harmonic filter is displayed between the two lenses at their common focal plane. When the two image systems are compared, the image in the system with the filter is clear and sharp while the other one is not.

BRIEF DESCRIPTION OF THE DRAWINGS

These and other aspects of the invention will be described in detail with reference to the accompanying drawings, wherein.

DESCRIPTION OF THE PREFERRED EMBODIMENTS

Figure 1A:
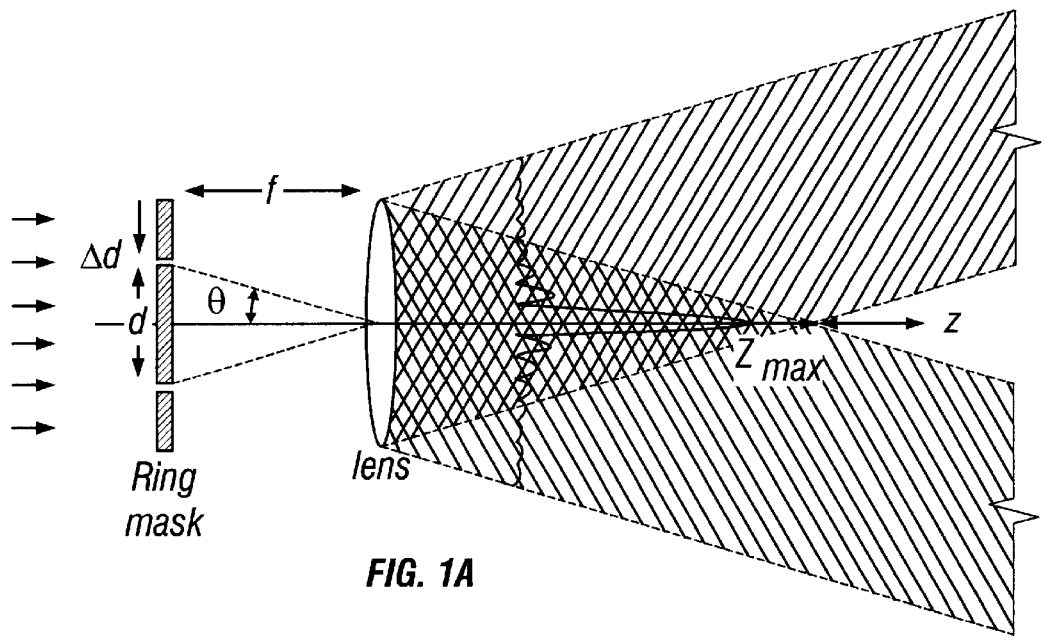
FIGS. 1A, 1B, and 1C shows a schematic setup of the ring mask for generating an approximation to a Bessel function.
Figure 1B:
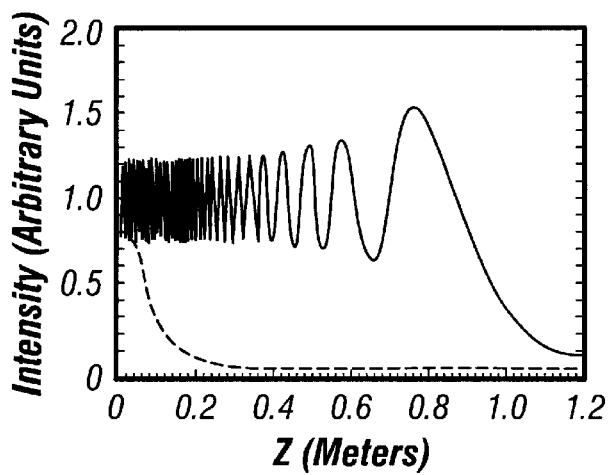
Figure 1C:
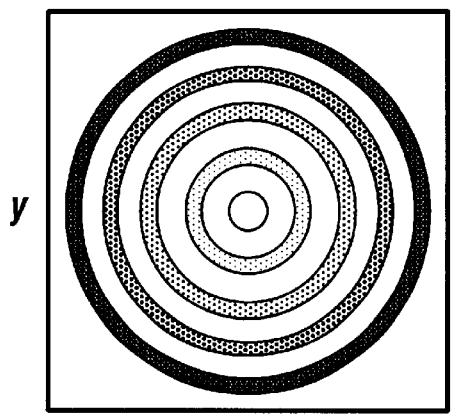
Figure 2A:
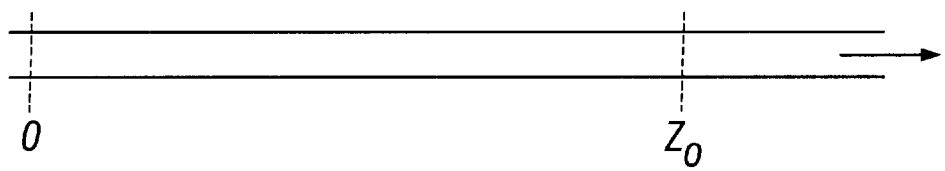
FIGS. 2A through 2C show characteristics of a non-diffracting beam.
Figure 2B:
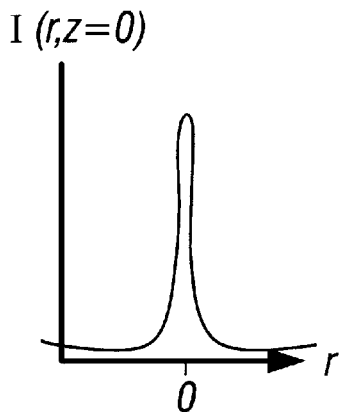
Figure 2C:
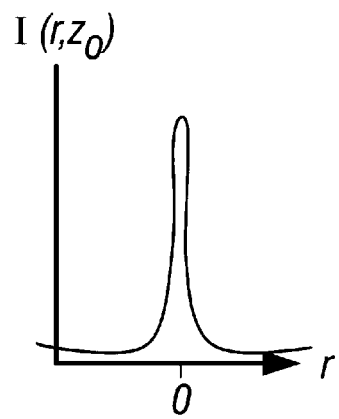

A first important feature of the present invention is the "sword beam". The sword beam shown in FIG. 2A is a beam that maintains substantially constant intensity along the optical axis for a defined interval. FIG. 2B shows the distribution of the beam at a position we call z=0. FIG. 2C shows that the distribution is very similar at a position spaced from zero, a position we call $z_0$. The Gaussian beam has entirely different characteristics. The beam has a constant width for a distance from z=0 to $z=z_1$. The beams diverge at the Rayleigh distance $z_1$, and at $z_0$ the beam distribution has entirely changed.

Figure 3A:
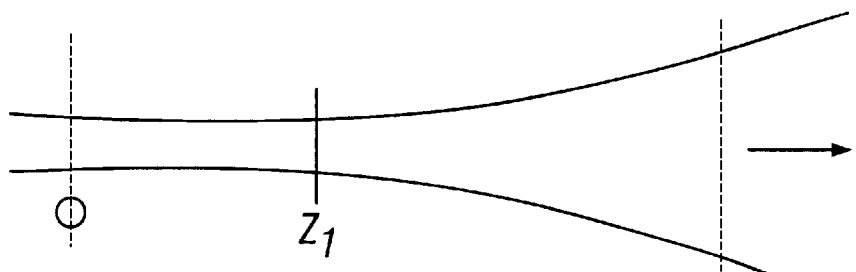
FIGS. 3A through 3C show the characteristics of a Gaussian beam.
Figure 3B:
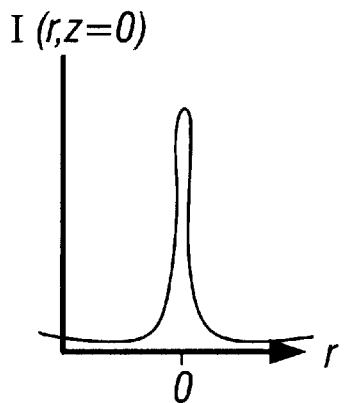
Figure 3C:
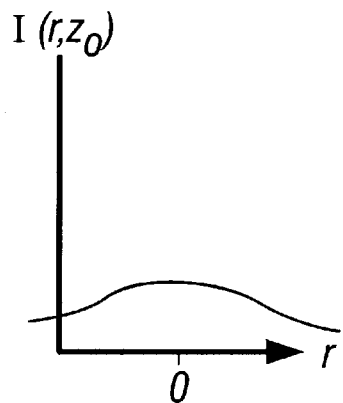

FIGS. 3A, 3B, and 3C show the difference between the Gaussian and the non-diffracting beam shown in FIGS. 2A through 2C. The lateral width at any cross section of the sword beam is similar to any other cross section. The width is more similar per length as compared to a Gaussian of the same length which is to say that it changes much slower than the Gaussian beam formed by a non-filtered laser.

This sword beam is a pseudo-non-diffracting beam. A totally non-diffracting beam would be a totally collimated beam of light such as an ideal Bessel beam with infinite energy. No practical implementations of this theoretical beam currently exist. In some finite radius the Bessel beam will be truncated. This truncated PNDB is an approximation to the ideal case. While the ideal NDB theoretically has a constant axial intensity forever, the PNDB has an almost constant axial intensity along a finite propagation distance.

Figure 4:
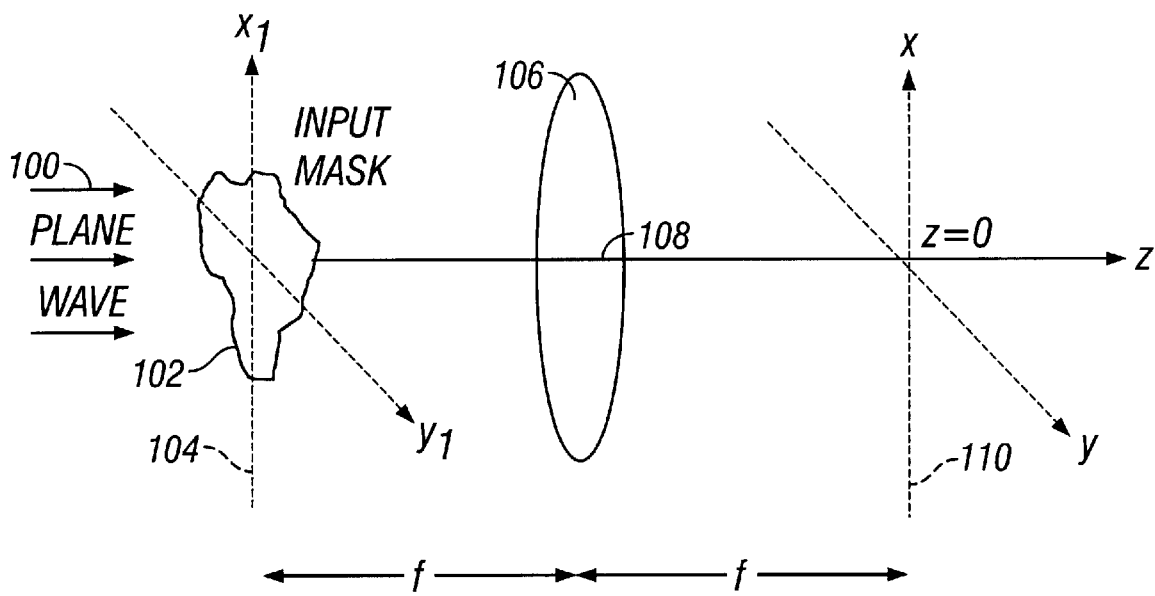
FIG. 4 shows the basic optical layout of the system from the present invention.

The basic system is shown in FIG. 4. An input plane wave 100 corresponds to the image to be focused. Plane wave 100 is passed through input mask 102. The input mask 102 has x and y directions shown in the figure, and is preferably located at the rear focal plane 104 of a light altering element, preferably lens 106. Input mask 102 is also preferably centered on the optical axis 108 of lens 106. The image is altered, preferably focused, to the second side of lens 106, to the front focal plane 110.

Figure 4A:
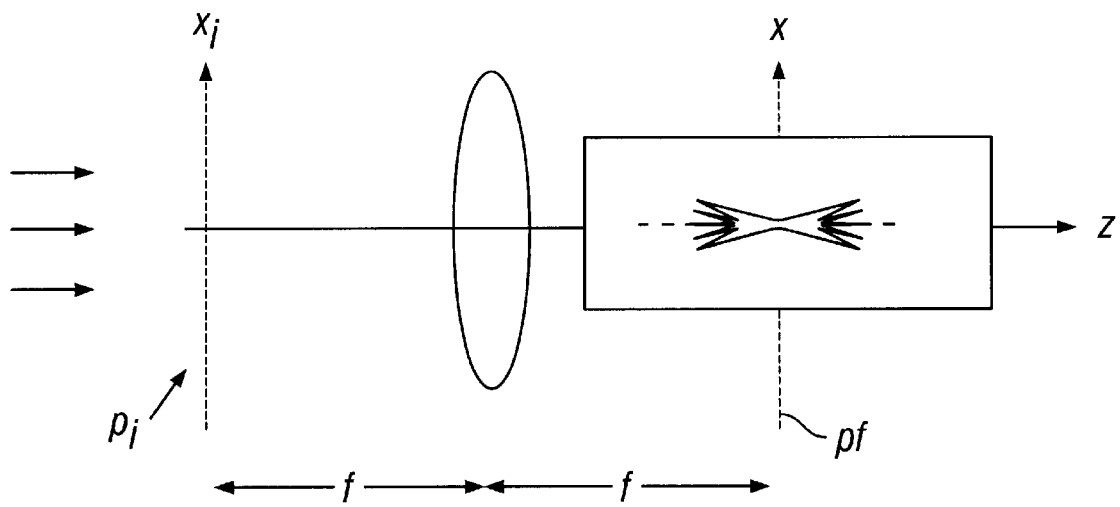
FIGS. 4A and 4B respectively show the difference between the output from a lens and the output of the system from the present invention configured to obtain a sword beam.
Figure 4B:
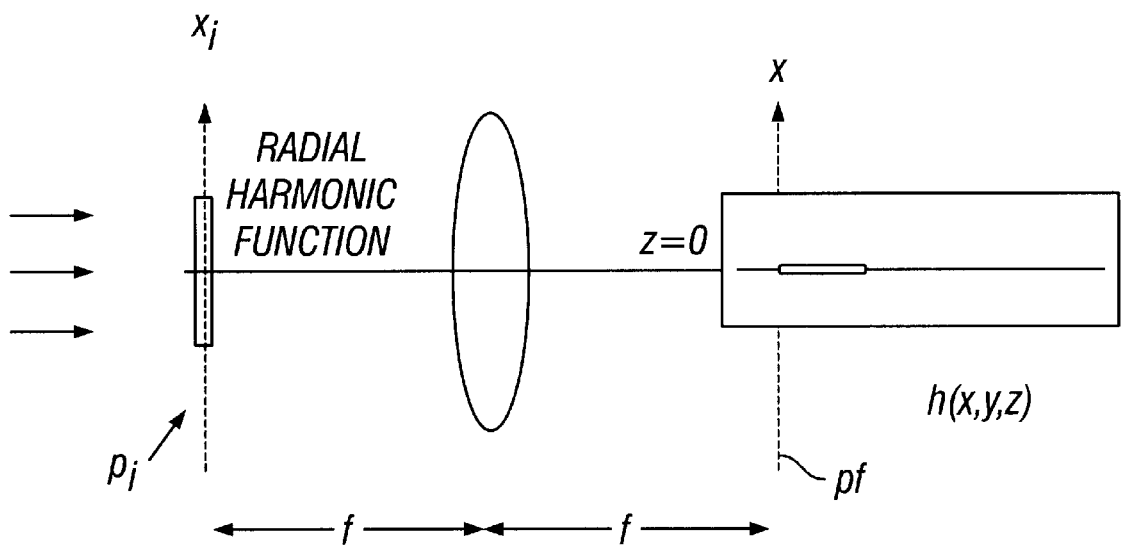

FIGS. 4A and 4B show the differences between the results obtained from the focused beam from a clear aperture lens and the sword beam obtained from the radial harmonic function. FIG. 4A shows the focused beam. The beam is sharp only right at the focal point. In contrast, the system shown in FIG. 4B has a sharp beam for a long distance along the z axis.

The light altering parameters of input mask 102 define the characteristics of the beam as described herein. The present invention defines parameters that can be adjusted to affect the transverse width of the beam, the side lobe height of the beam, and the longitudinal interval height of the beam.

The most well-known non-diffracting beam is a Bessel beam forming an $E(r,z)=A\exp(j\beta z)J_o(\alpha r)$ solution to the free space scalar wave equation, in which $a^2+\beta^2=k^2$, where k is the wave number, $J_o$ is the zero-order Bessel function and r,z are the cylindrical coordinates. This beam has an intensity distribution in the entire space which is independent of the z coordinate. Its transverse intensity profile has a beamlike shape.

It has been shown that the Bessel beam can be obtained by illuminating an annular aperture, located at the rear focal plane (plane $P_i$ in FIGS. 4A and B) of a spherical lens. This last phenomenon can be generalized by assuming an arbitrary function $g(r_i,\Theta_i)$, with circular symmetry so that $g(r_i,\Theta_i)=g(r_i)$ is placed as a transparency distribution at plane $P_i$. Under the Fresnel approximation, the complex amplitude distribution around the focal plane $P_f$ is $$u(r,z) = \frac{\exp[jk(z+2f)]}{j\lambda f} \int_0^\infty g(r_i) J_0\left(\frac{2\pi r r_i}{\lambda f}\right) \exp\left(-\frac{j\pi z r_i^2}{\lambda f^2}\right) r_i dr_i \quad (1)$$

where $k=2\pi/\lambda$, $\lambda$ is the wavelength, f is the focal length of the lens, $r_i$ is the radial coordinate of plane $P_i$, and (r,z) are the cylindrical coordinates behind the lens, with the focus as their origin. Substituting r=0 into Eq. (1) shows the Fourier transform relation between the longitudinal profile u(r=0,z) around the front focal plane of the lens (plane $P_f$) and the square radial distribution of the field in the rear focal plane (plane $P_i$), i.e.

$$u(0,z) = \frac{\exp[jk(z+2f)]}{j2\lambda f} \int_0^\infty g(\sqrt{\rho_i}) \exp\left(-\frac{jkz\rho_1}{2f^2}\right) d\rho_i \quad (2)$$

where $\rho_i=r_i^2$. Equation 2 shows the Fourier relationship between the final field beam and the radial distribution of the hologram. g is the information at the rear focal point. The annular aperture, for instance, is represented by $g(r_i)=\delta(r_i-a)$. Substituting that into Eq. (1) yields $u(r,z)=aJ_o(kar/f)\exp[jkz(1-a^2/2f^2)]$, i.e. the Bessel beam. The three dimensional intensity distribution of the Bessel beam is independent of z in the entire space z>0.

Realistically, however, an infinite energy would be necessary to implement the Bessel beam. In practice, any truncation yields a pseudo-non-diffracting beam whose intensity changes along its propagation.

A real annular mask can hence only yield an approximation to the ideal Bessel beam in the sense that the intensity peak value of this beam oscillates slightly around some constant value up to a point where the intensity drops down significantly. Therefore, this approximation allows obtaining a non-diffracting beam. These approximations are used to obtain pseudo-non-diffracting beams with features sometimes superior to the Bessel beam. However, we still have the insurmountable problem that the ring mask blocks a majority of the optical energy, and hence, produces an extremely inefficient optical system.

The techniques described herein allow obtaining a practical pseudo-non-diffracting beam, i.e., one which does not require infinite energy. This is done according to the present invention by producing a pseudo-non-diffracting beam using a new kind of function.

It is an object of the present invention to form a PNDB without a ring mask. A radial harmonic function (RHF) is preferably used. An RHF of order 4, in which virtually none of its optical energy is absorbed, is even more preferable.

The inventors of the present invention recognized that a phase-only function would absorb virtually no energy. The inventors therefore looked for functions that would give a constant distribution in the axial direction after computing the intensity or the absolute value of such function. There are at least two such functions which exist. One such function is the delta function (in the radial axis of the mask) which provides a constant distribution in the longitudinal axial direction. The ring mask is one form of delta function. The present inventors rejected using the ring mask but instead used other functions that approximately yield constant intensity profile along the longitudinal axis.

We remember that Eq. (2) express a Fourier transform of the field from the mask domain to the longitudinal axis, and there we look for a constant distribution of the intensity (the squared magnitude of the field). Another function, besides the delta function, to obtain a constant profile of its Fourier transform magnitude, is the phase function of order 2. In other words the absolute value of the Fourier transform of $\exp(jk\rho^2)$ is constant. The function given by Eq. (5), described herein, is a phase function of order 2 in the $\rho_i$ coordinate; therefore, it is hence a radial function of order 4 in the real coordinate $r_i$. This function is implemented by a Fourier hologram positioned at the rear focal plan of the lens.

The present invention preferably uses a radial harmonic function of order 4 recorded on the mask. The mask is itself preferably a hologram. The parameters of the function affect the light-passing properties of the radial harmonic function coded on a Fourier hologram on input mask 102. The key is to form a pseudo non-diffracting beam.

Pseudo-Non-Diffracting Beam

A beam u(r,z) is a pseudo-non-diffracting beam if the following set of three equations are satisfied:

$$|u(0, Z)|^2 = \text{Substantially Constant}, \forall z \in \Delta z \quad (3a)$$

$$\text{MAX}_r\{|u(r, z)|\} = |u(0, z)|, \forall z \in \Delta z. \quad (3b)$$

$$\lim_{r \to \infty} |u(r, z)| = 0, \forall z \in \Delta z, \quad (3c)$$

defining the z axis as the place where we want the beam, and where the "substantially constant" means that in the ideal unachievable case of infinite apertures, the intensity is constant along the axis. However, due to practical finite aperture size, the intensity is only substantially constant with a variation of around 30%.

Equation 3a represents the requirement that the peak intensity of the beam stays substantially constant along the optical axis for some interval $\Delta z$, where $\Delta z$ represents the interval of interest.

Equations 3b and 3c define the beamlike shape to the transverse intensity distribution of the beam at any point inside the interval $\Delta z$. Specifically, equation 3b requires that the maximum of the lateral distribution is obtained on the desired axis, here the z axis. The distribution around the z axis is a bell curve. Equation 3c requires that the magnitude of the beam approaches zero at a position that is an infinite distance from the optical axis. More generally, the intensity approaches zero as we get further from the optical axis.

The present inventors realized that any function that approximates these requirements can be used to obtain a pseudo-non-diffracting beam.

The present inventors found that the following radial harmonic function approximately satisfies Equations (3):

$$g_p(r_i) = (r_i/a)^{(p-4)/2} \exp[j2\pi(r_i/b)^p] p \geq 4, \quad (4)$$

p must be a real number greater than 4 in order to avoid singularity of $g_p(r_i)$ at the origin, and a,b must be real numbers. The special case of p=4 is especially interesting, since the function reduces to $$1 \cdot \exp\left[j2\pi\left(\frac{r_i}{b}\right)^4\right] \quad (5)$$

More generally, however, a readial harmonic function is a function that has a harmonic distribution of any order p (p is some real number) along its radial corrdinate r. In the term harmonic distribution, we mean that the phase distribution of the complex function is a polonium of an order P.

Hence, the fourth order phase function is a pure phase function in this family of functions. Consequently, substantially no light is absorbed when light passes through a mask with the transparency function of $g_{p=4}(r_i)$. The results are described herein for this specific preferred case, but it should be understood that these results could be used with any radial harmonic function, of any order, and over any range of radii. The value of r/a in equation 4 is an amplitude correction which must be used if the phase function is greater than of order 4. Note that equation 4 is a non-unique solution to equations 3a–3c since the solution $g(r_i) = \delta(r_i - \gamma)$, real $\gamma$, also satisfies Eqs. (3). This solution leads to the well-known Bessel beam.

The input mask 102 is preferably a hologram formed with these radial harmonic functions thereon. These allow us to determine various information about the distribution of the beams.

Substituting equation 4 into equation 2, we obtain the solution that $$u(0, z) \cong \frac{\exp[jk(z+2f) + j\pi/4]}{j\lambda f} \sqrt{\left(\frac{b^p}{p(p-2)a^{p-4}}\right)} \exp\left(-j\pi\gamma z^{\frac{p}{p-2}}\right), \quad (6)$$

$$z > z_1$$

where $$\gamma = (p-2)\left(\frac{b^2}{p\lambda f^2}\right)^{\frac{p}{(p-2)}} \stackrel{p=4}{=} \frac{b^4}{8\lambda^2 f^4}, \quad (6.a)$$

and $$z_1 = \frac{p\lambda f^2}{b^2(2p-4)^{\frac{(p-2)}{p}}} \stackrel{p=4}{=} 42\lambda \frac{f^2}{b^2} \quad (6.b)$$

Over a certain interval, $\Delta z = [z_1, \infty]$, the intensity along the z axis is approximately constant and Eq. (3.a) is satisfied. The phase distribution of u(0,z) varies from a quadratic phase, for p=4, down to a linear phase in the limit of p→∞. The starting point $Z_1$ is calculated based on the condition that the phase value $\mu(r)$ of the integrand of Eq. (2), at the significant stationary point $r_s$, is $\pi/2$. This point is far enough (z is large enough) from the zero point ($r_i = 0$, another stationary point but not a contributing one), so that it fully contributes to the integral value. Formally, the condition $$k\mu(r_s) = \frac{2\pi r_s^p}{b^p} - \frac{\pi z_1 r_s^2}{\lambda f^2} = \frac{\pi}{2} \quad (7)$$

should be satisfied, where $$r_s = \left(\frac{b^p z}{p \lambda f^2}\right)^{\frac{1}{(p-2)}} \quad (7a)$$

is the stationary point obtained as the solution of the equation $d\mu/dr_i = 0$.

Figure 5:
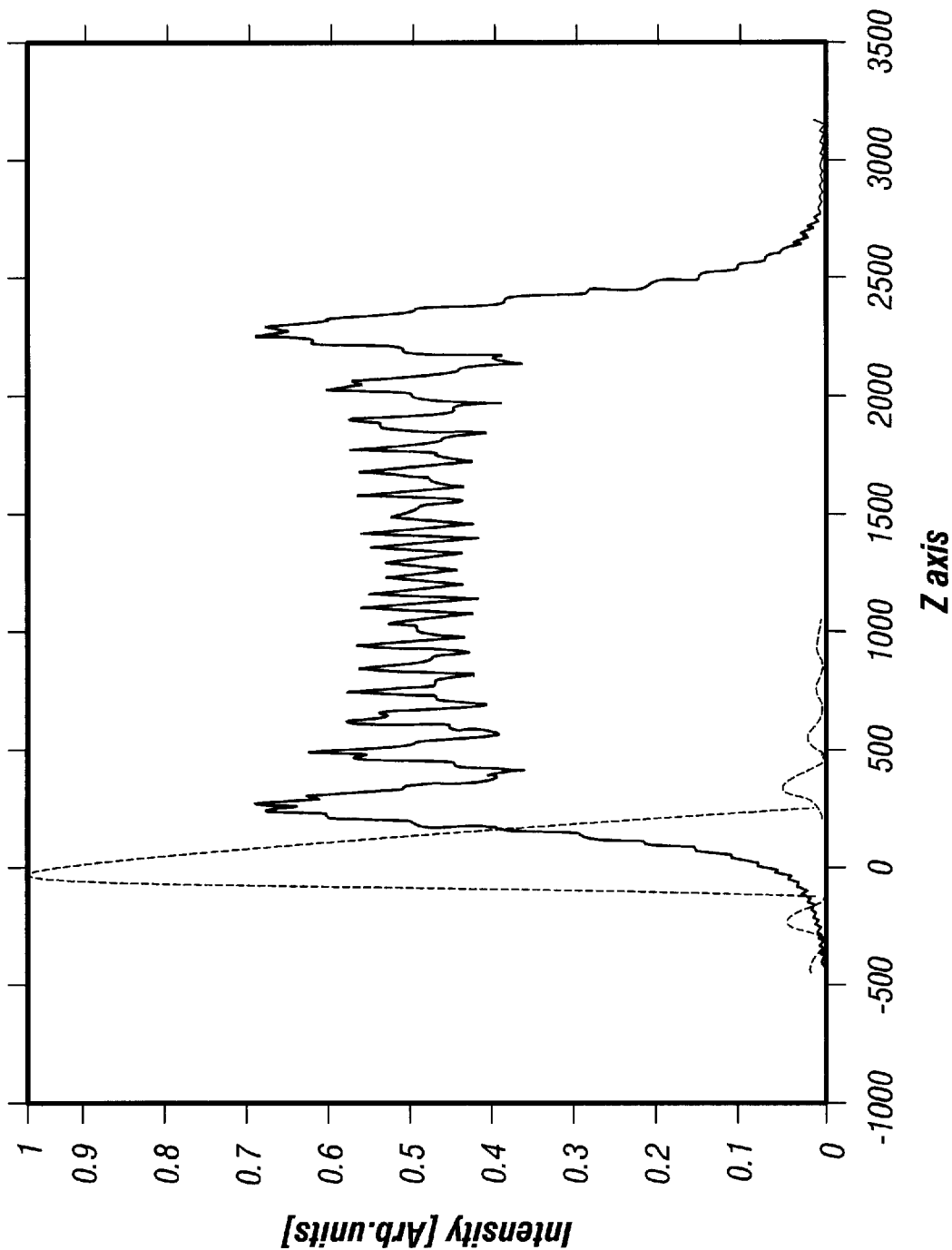
FIG. 5 shows a graph of this difference as a function of the z axis.

Practically, an infinite function $g(r_i)$ cannot be implemented, and when the finite radius $R_o$ of the input mask (the fourth parameter of the radial harmonic functions, in addition to a,b and p, assuming $R_o > b$) is taken into account, the absolute value of u(0,z) oscillates around a constant level along a finite interval $\Delta Z = Z_2 - Z_1 \approx Z_2$. This response is shown by the solid line in FIG. 5 for the parameters p=4, b=256 pixels, $R_o$=512 pixels. FIG. 5 shows that the intensity varies from approximately 0.71 units, to approximately 0.38 units. Hence, the variation as shown is approximately ±30% from the average value of approximately 0.5 maximum. It should be understood, however that this intensity variation could be more than this. There is not any limitation on how large the variance of the beam can be. The trick is to decrease this variance and there is not any practical meaning to increase it. The large variance results from the edge effects of the mask. If we take a wider mask or increase the parameter b of the radial harmonic function, the variance in the middle of the axial interval decreases and can be completely eliminated. The term "substantially constant", as used throughout this specification and claims encompasses these variations.

For comparison, the axial response of a clear aperture lens of diameter 2b is shown by the dashed line. The lens focal length is much shorter, as shown by the width of the curve. The value of the bend point $Z_2$ is calculated based on the condition that the stationary point is located close to the edge of the aperture, at the last point where it fully contributes to the integral result [Eq. (2)] (i.e. $r_{s|z=z2}=R_o$). Using Eq. (7a), $z_2$ is given by $$z_2 = \frac{p\lambda f^2 R_o^{p-3}}{b^p}\left[R_o - \sqrt{\frac{(p-2)b^p}{2pR_o^{p-2}}}\right]_{p=4} = \frac{2\lambda f^2(2R_o^2 - b^2)}{b^4} \quad (8)$$

Equation 8 shows that the longitudinal interval $\Delta Z$ can increase by increasing the parameters $R_o$, or p, or by decreasing b.

The lateral distribution of the beam is obtained by substituting equation 4 into equation 1, thereby obtaining $$u(r,z) \cong \frac{\exp[jk(z+2f)+j\pi/4]}{j\lambda f} J_e\left[\frac{2\pi R}{\lambda f}\left(\frac{b^p z}{p\lambda f^2}\right)^{\frac{1}{(p-2)}}\right] \quad (9)$$

$$\sqrt{\left(\frac{b^p}{p(p-2)a^{p-4}}\right)} \exp\left(-j\gamma z^{\frac{p}{p-2}}\right) \quad z \in \Delta z$$

Equation 9 shows that when $p \to \infty$, the beam becomes the Bessel beam. This beam is equivalent to a Bessel beam obtained by illuminating an annular function $g(r_i)=\delta(r_i-b)$. The ratio $b/_a$ determines whether the energy of the beam increases ($b/_a>1$) or decreases ($b/_a<1$), with increasing p. In that sense this pseudo-non-diffracting beam is general and contains the solution of the Bessel beam.

Equation (9) also shows that the full width at half maximum (FWHM) of the lateral pulse intensity is $$W_p(z) \cong \frac{2.26}{2\pi}\left(\frac{p\lambda^{p-1}f^p}{b^p z}\right)^{1/(p-2)} \underset{p=4}{=} 0.72\frac{f^2}{b^2}\sqrt{\left(\frac{\lambda^3}{z}\right)} \quad (10)$$

The full width at half maximum decreases along the optical axis proportional like $Z^{-(1/(p-2))}$, or in other words the full width at half maximum falls off as $Z^{-\frac{1}{2}}$ for p=4 and becomes independent of z for $p \to \infty$.

Substituting Eq. (6b) into Eq. (10) shows that at $z_1$ the full width at half maximum is independent of the radius $R_o$, and given by $$W_p(z_1) \cong \frac{2.26}{2\pi b}(2p-4)^{\frac{1}{p}} \underset{p=4}{=} 0.51\lambda\frac{f}{b} \quad (11)$$

This full width at half maximum is approximately equal to the full width at half maximum of a focal spot obtained by illuminating a lens of a focal length f and a clear aperture with diameter $2b$. Substituting Eq. (8) into Eq. (10), and assuming $R_o >> b$, at $z_2$ the full width at half maximum is independent of p or b, and is given by $$Wp(Z_2) \approx \frac{0.36\lambda f}{R_0} \quad (12)$$

which is approximately equal to the full width at half maximum of a focal spot obtained by illuminating a lens of focal length f and a clear aperture with a diameter $2.8R_o$.

The radial harmonic function optical system, therefore, has the minimum resolution (at $z_1$) of a clear aperture system with a pupil diameter of $2b$. Moreover, increasing the diameter of the radial harmonic function does not change this resolution, but increases the system's depth of focus, and decreases the focal spot's width along the extended depth of focus. Furthermore, the maximum resolution (at $z_2$) is 40% better than that of a clear aperture system with a pupil diameter of $2R_o$.

This allows us to compare the pseudo-non-diffracting beam to the Gaussian beam. The Rayleigh depth of focus is $$\Delta z_G = \frac{4W^2}{\lambda}$$

where W is the full width at half maximum of the beam. The ratio between the longitudinal interval of the pseudo-non-diffracting beam, given in Eq. (8), and the depth of focus for the Gaussian beam is $$\frac{\Delta z_p}{\Delta z_G} = \frac{p\lambda^2 f^2 R_o^{p-2}}{4W^2 b^p} \quad (13)$$

When the pseudo-non-diffracting beam is compared to a Gaussian beam with $w=w_p(Z_1)$, the ratio becomes $$\frac{\Delta z_p}{\Delta z_{G|W=W_p(z_1)}} = \frac{1.93p}{(2p-4)^{2/p}}\left(\frac{R_o}{b}\right)^{p-2} \underset{p=4}{\cong} 4\left(\frac{R_o}{b}\right)^2 \quad (14)$$

When the pseudo-non-diffracting beam is compared to a Gaussian beam with $w=W_\rho(Z_2)$, the ratio becomes $$\frac{\Delta z_p}{\Delta z_{G|W=W_p(z_2)}} = 1.93p\left(\frac{R_o}{b}\right)^p \underset{p=4}{\cong} 8\left(\frac{R_o}{b}\right)^4 \quad (15)$$

Hence, the pseudo-non-diffracting beam always has a longer focal depth than the Gaussian beam if $R_o > b$, even with the wider waist of $w=W_p(Z_1)$. This superiority increases with p and with the ratio $R_o/_b$.

For the Gaussian beam, decreasing the system aperture (or the numerical aperture), by x times causes an increase in the depth of focus by $x^2$, and a decrease in the lateral resolution by x times. On the other hand, for the pseudo-non-diffracting beam for p=4, decreasing the system aperture by the same amount does not change the resolution of the beam (as long as $R_o > b$) and decreases the depth of focus by $x^2$. Moreover, decreasing the parameter b by x times decreases the resolution by the same amount but increases the depth of focus by $x^4$. The behavior of this pseudo-non-diffracting beam is completely different from that of an ordinary beam, and trying to manifest an analogous distance to the Rayleigh distance yields [by substituting Eqs. (11) and (12) into Eq. (8), and choosing p=4]

$$\Delta z_p \cong \frac{16[W_p(z_1)]^4 NA^2}{\lambda^3} \cong \frac{8 \cdot 3[W_p(z_1)]^4}{\lambda[W_p(z_2)]^2}, \quad (16)$$

where NA=D/f is the numerical aperture.

The preceding description is largely theoretical. However, these equations can be used to make a real hologram plate which forms the Pseudo Non-Diffracting Beam.

In order to really affect these fields, we must consider other practical effects. In practice, approximations to the Bessel beam are used. Moreover, in order to effect these characteristics properly, a way of changing the characteristics of the hologram must be defined. The inventors of the present invention have defined such a way which is described herein

Shifting Positions

We define a transform, called the focal space transform (FST), that will allow shifting the position of the output beam as $$u(x,y,z) = \text{FST}\{g(x_i, y_i)\}$$

$$= \frac{\exp[jk(z+2f)]}{j\lambda f}$$

$$\int_{-\infty}^{\infty}\int_{-\infty}^{\infty} g(x_i, y_i) \exp\left(\frac{j2\pi(xx_i + yy_i)}{\lambda f} - \frac{j\pi z(x_i^2 + y_i^2)}{\lambda f^2}\right) dx_i dy_i,$$

wherein $u(x,y,z)$ is the complex amplitude in the entire space around the focal plane $P_f$, resulting from the input distribution $g(x_i, y_i)$. This is the Cartesian version of Eq. (1). Manipulating this equation changes the hologram that is recorded, and hence changes some characteristic of the beam.

The above has discussed how to form the pseudo non-diffracting beam. The present invention also teaches how to move the position of that beam—shift the beam on and off the optical axis as well as tilting the beam.

The following quantify the changes in the distribution behind the lens due to modification of the input function $g(x_i, Y_i)$.

Figure 6:
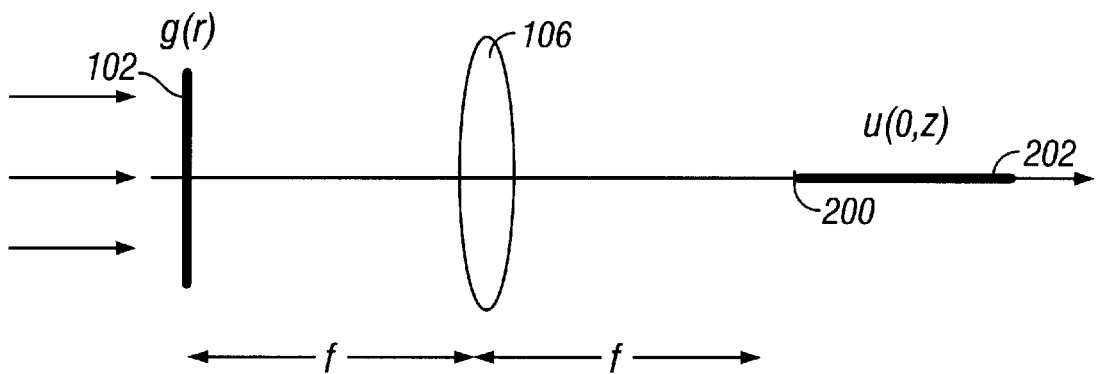
FIG. 6 shows the position of the pseudo non-diffractive beam of the present invention using a radial harmonic function.

The original hologram is shown in FIG. 6, with the input function $g(r)$ and its output function 202 $u(0,z)$ on the z axis on the focal point 200.

I. Complex conjugate—if $$\text{FST}\{g(x_i, y_i)\} = u(x,y,z) \text{ then}$$

$$\text{FST}\{g^*(x_i, y_i)\} = \exp(j4kf - j\pi) u^*(-x, -y, -z).$$

Figure 7:
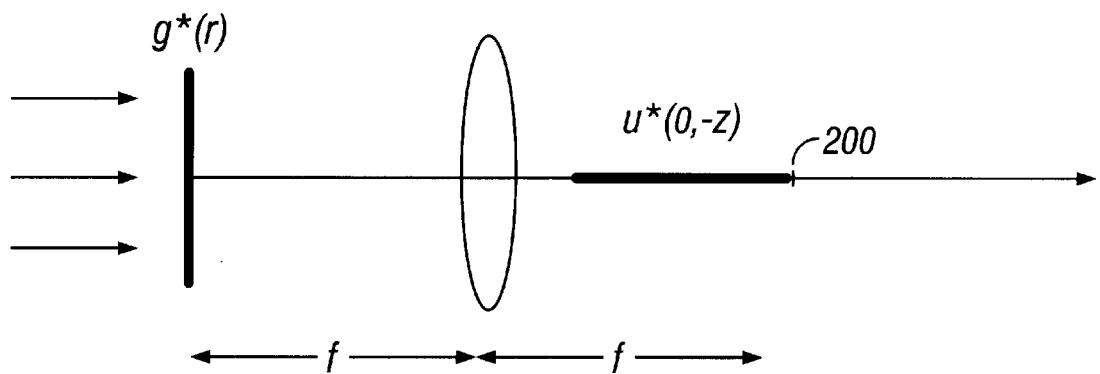
FIG. 7 shows the effect of displaying a complex conjugate of this radial harmonic function.

Hence, replacing the input function by its complex conjugate flips the intensity distribution about its origin, focal point 200. The function is now "flipped" relative to the focal point as shown in FIG. 7.

Linear Phase—if $$\text{FST}\{g(x_i, y_i)\} = u(x,y,z) \text{ then}$$

$$\text{FST}\{g(x_i, y_i) \exp[j2\pi(d_x x_i + d_y y_i)]\} = u(x + \lambda f d_x, y - \lambda f d_y, z).$$

Figure 8:
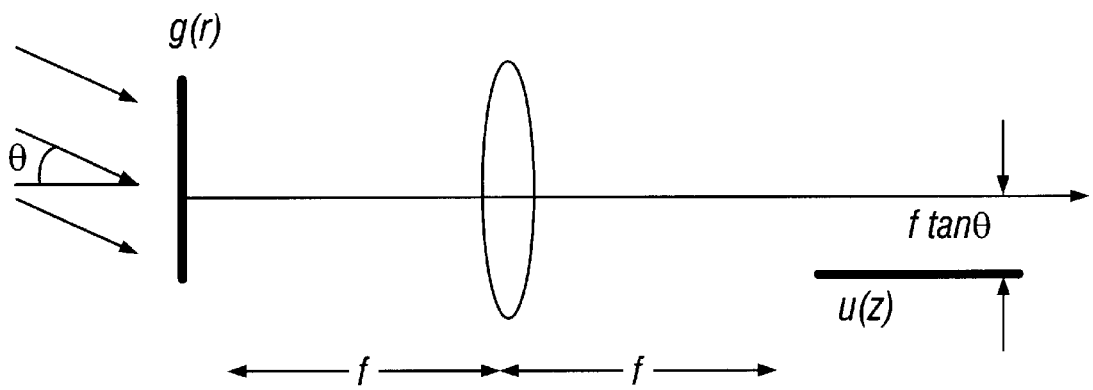
FIG. 8 shows the result of changing the linear phase of the radial harmonic function.

Multiplying $g(x_i, y_i)$ by a linear phase function with parameters $d_x, d_y$, hence shifts the longitudinal beam laterally by distances $(\lambda f d_x, \lambda f d_y)$, that are directly related to the phase constants. FIG. 8 shows how the beam is shifted relative to the optical axis.

III. Quadratic phase—if $$\text{FST}\{g(x_i, y_i)\} = u(x,y,z) \text{ then}$$

$$\text{FST}\{g(x_i, y_i) \exp(j2\pi\alpha r_i^2)\} = \exp(j4\pi f^2\alpha) u(x, y, z - 2\lambda f^2 \alpha).$$

Figure 9:
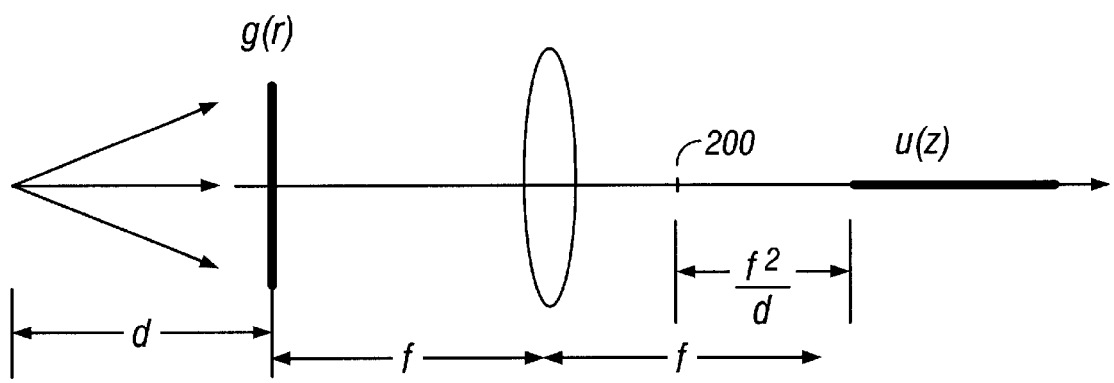
FIG. 9 shows the result of changing the quadratic phase.

Hence, multiplying $g(x_i, y_i)$ by a quadratic phase function shifts the longitudinal beam along the z axis by a distance $2\lambda f^2 \alpha$ that is directly related to the phase constant. This is shown in FIG. 9.

Figure 10:
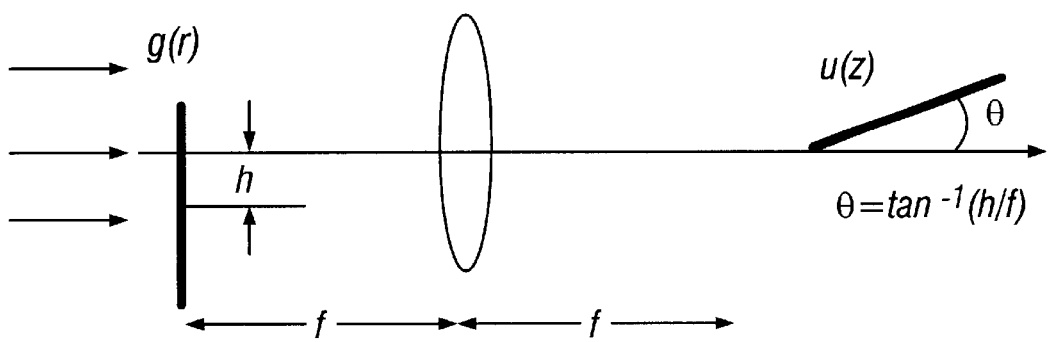
FIG. 10 shows forming a lateral shift.

IV. Lateral Shift—if $$\text{FST}\{g(x_i, y_i)\} = u(x,y,z) \text{ then}$$

$$\text{FST}\{g(x_i - d_a, y_i - d_b)\} = \exp[jk\chi] u(\bar{x}/\cos\theta, \bar{y}/\cos\phi, \bar{z}\cos\theta\cos\phi),$$

where $$\chi = x\tan\theta + y\tan\phi - \frac{Z}{2}(\tan^2\theta + \tan^2\phi)$$

$$\tan\theta = \frac{d_a}{f}, \tan\phi = \frac{d_b}{f}$$

where $\bar{x}, \bar{y}, \bar{z}$ is the tilted coordinates system, an angle $\theta$ from the yz plane, and $\phi$ from the xz plane. Hence when the input function is shifted laterally the output beam is rotated around the focal point by angles $(\theta, \phi)$, whose tangents are directly related to the lateral shift $(d_a, d_b)$. The longitudinal dimension of the rotated beam is stretched by the factor $\sec\theta\sec\phi$, while the lateral dimensions (x,y) are shrunk by the factors $\cos\theta$ and $\cos\phi$, respectively. FIG. 10 shows that when the hologram is shifted, the output beam is tilted.

V. Similarity—if $$\text{FST}\{g(r_i)\} = u(x,y,z) \text{ then}$$

$$\text{FST}\{g(sr_i)\} = \frac{\exp[jkz(1 - s^{-2})]}{s^2} u\left(\frac{r}{s}, \frac{z}{s^2}\right).$$

Hence, shrinking (stretching) the size of the input function by s times increases (decreases) the longitudinal dimension of the beam by $s^2$ times, while the lateral dimension increases (decreases) by only s times.

The next theorem does not belong to the previous longitudinal Fourier hologram theorems. This theorem considers the effect of shifting the hologram along the z axis out of the rear focal plane. Therefore, the hologram cannot be considered as a longitudinal Fourier hologram anymore, and none of the previous theorems apply.

VI. Longitudinal Shift—if $$\text{FST}\{g(x_i, y_i)\} = u(x,y,z)$$

then displaying the input mask an arbitrary distance d from the lens yields a longitudinal distribution $$\bar{u}(x,y,z)$$

given by $$\bar{u}(x,y,z) = A(x,y,z) u(\bar{x}, \bar{y}, \bar{z}),$$

where, $$(\bar{x}, \bar{y}, \bar{z}) = \frac{f^2}{z(f - d) + f^2}(x, y, z)$$

$$A(x, y, z) = \frac{f^2 \exp\left[jk\left(z + d - f + \frac{(f-d)r^2 - 2f^2 z}{2[z(f-d) + f^2]}\right)\right]}{z(f - d) + f^2}$$

When the distance between $g(x_i, y_i)$ and the lens is changed from f to another distance d the longitudinal field is transformed to the (x,y,z) coordinates, and the function A(x,y,z) induces attenuation along the z axis compared to the case of d=f. Of course, when d=f then $$\bar{u}(x,y,z) = u(x,y,z)$$

These theorems enable to shift, scale and tilt the PNDB in the entire space. Another application for them is creating arbitrary twisted focal lines, so called 'snake beams', as described herein. More generally, however, many lens or similar light altering elements have an inherent distance of focus—they focus light to a focal point. Appropriate application of the above techniques allow adjusting the position of the beam relative to this inherent place of focus. This specification and claims uses the term place of focus to include focal point, focal line and focal areas to cover all such optical systems.

The radial harmonic function can be modified according to any combination of the above theorems. It can hence be coded on a simple binary 0, 1 transparency, avoiding the use of a complicated and expensive phase mask. The above theoretical results are well demonstrated by the practical. The technique of the present invention uses a hologram instead of a phase mask.

A phase mask is known in the art as an element which changes the phase of light that passes without absorbing any of that light. A real phase mask can be formed by changing thickness of a glass structure for each pixel of the image. This real phase mask is very expensive to produce, but produces a different phase value for each pixel. This produces only one diffraction order image. It is also possible to approximate this by coding the phase function on a hologram. This acts like a phase mask but the phase is coated thereon. This produces a three diffraction orders, one of which is the useful beam.

In order to demonstrate the hologram, it is necessary to record a "real" radial harmonic function. The radial harmonic function is a complex phase function. Therefore, adding that phase function and its conjugate provides a real value. The 4th order radial harmonic function $g_4$ and its conjugate $g_4^*$ is therefore recorded on the hologram. A real number is added to the $g_4+g_4^*$ to provide a real positive function.

Figure 11:
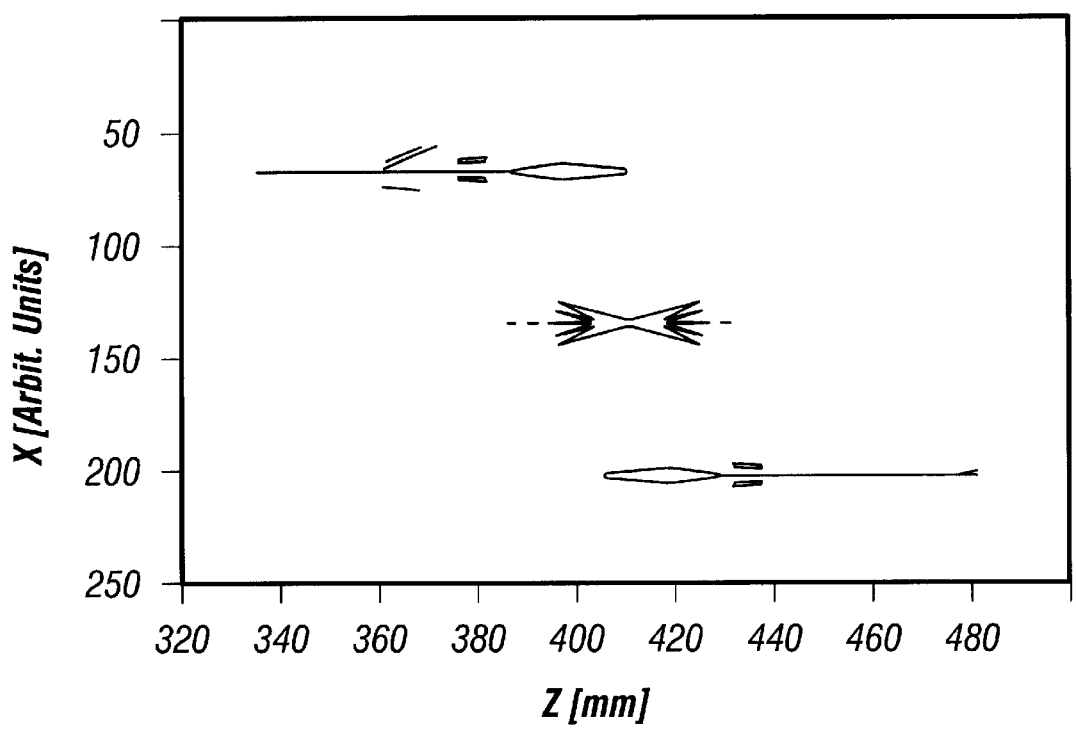
FIGS. 11 through 13 show the output result of three actual radial harmonic function systems.

We also want to be able to see the separation between the various elements so we multiply $g_4$ by $\exp(j2\pi x_i d_x)$ to take it off the optical axis. This is recorded therefore on the hologram as $$h(x_i, y_i) = \frac{1}{2} + \frac{1}{4}g_4(r_i)\exp(j2\pi d_x x_i) + \frac{1}{4}g_4^*(r_i)\exp[-j2\pi(d_x x_i)],$$

where $d_x=5.13$ mm$^{-1}$, b=3.72 mm and $R_o=6.2$ mm. If $|g_4(r_i)| \leq 1$, $h(x_i,y_i)$ is a positive real function. Using the half tone screening method to print out $h(x_i,y_i)$ from the computer, the gray level function $h(x_i,y_i)$ is converted into a binary {0,1} distribution. Note that h contains the radial harmonic function and its conjugate, each of them multiplied by a linear phase factor. From theorems I and II, we obtain, as shown in FIG. 11, two pseudo-non-diffracting beams, one existing in the interval [$z_1,z_2$] and laterally shifted by the distance $\lambda f d_x$ from the optical axis. The other exists in the interval [$-z_2,-z_1$] and is laterally shifted by the distance $-\lambda f d_x$ from the optical axis.

A central "real" part is also obtained from the constant factor.

Figure 12:
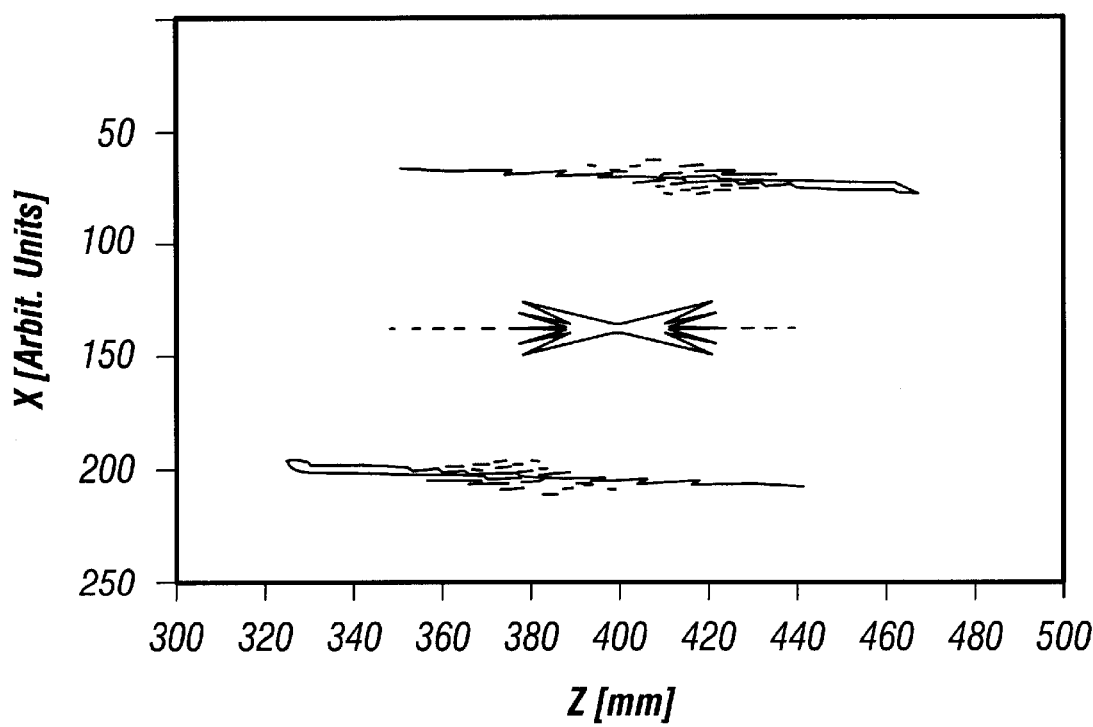

The next experiment demonstrates theorems I–IV together, and for that purpose the computed hologram is $$h(x_i, y_i) = \frac{1}{2} + \frac{1}{4}g_4(x_i - d_a, y_i)\exp[j2\pi(d_x x_i + \alpha r_i^2)] +$$
$$\frac{1}{4}g_4^*(x_i - d_a, y_i)\exp[-j2\pi(d_x x_i + \alpha r_i^2)]$$

where $\alpha=-0.31$ mm$^{-2}$, $d_a=20$ mm, b=3.6 mm and the other parameters, $d_x$ and $R_o$, are as in the previous example. According to theorem III, the two pseudo-non-diffracting beams should be shifted along their axis a distance $2\lambda f^2 \alpha$ forward the focal point. Following theorem IV, the beam should rotate an angle $\Theta_o=\tan^{-1}(d_o/f)=2.86°$ in the xz plane around the points ($\lambda f d_x,0$), for one beam, and ($-\lambda f d_x,0$), for the other. These effects are demonstrated clearly in FIG. 12.

Figure 13:
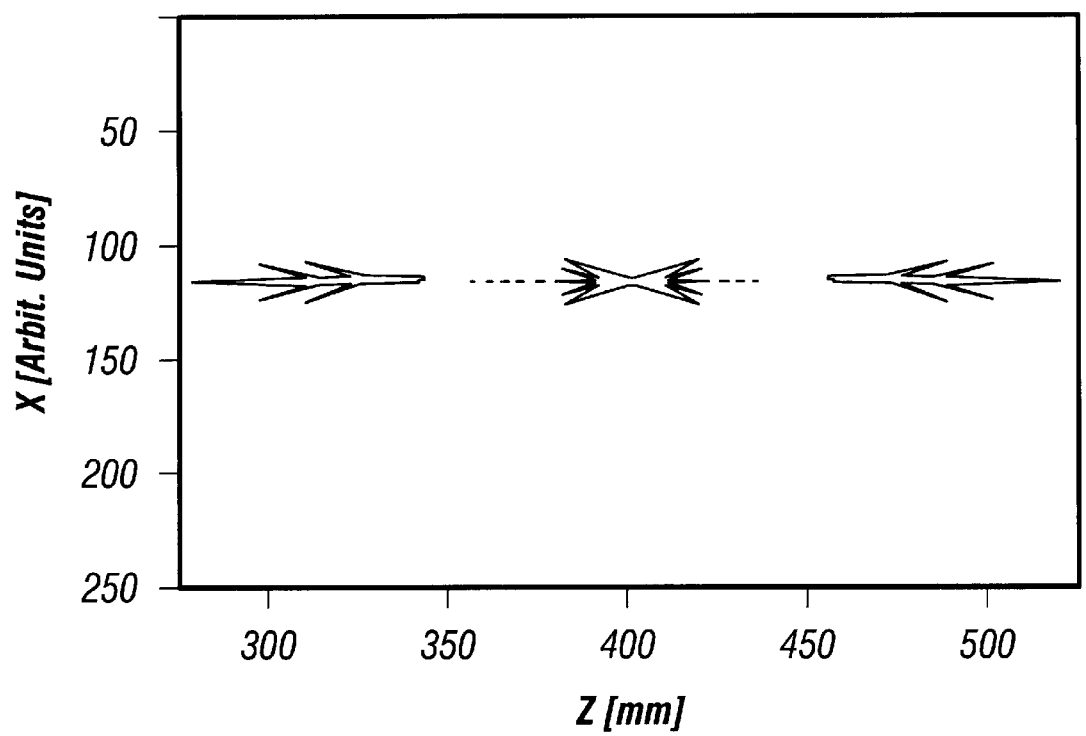

Theorem III allows producing a real positive hologram distribution, even without introducing a linear phase factor, as in the following example:

$$h(x_i, y_i) = \frac{1}{2} + \frac{1}{4}g_4(r_i)\exp[j2\pi\alpha r_i^2] + \frac{1}{4}g_4^*(r_i)\exp[-j2\pi\alpha r_i^2)]$$

where b=4 mm, $R_o=6.2$ mm, $\alpha=0.31$ mm$^{-2}$, and $d_a=d_x=0$. This time, as FIG. 13 shows the three diffraction orders are distributed along the optical axis.

Figure 4C:
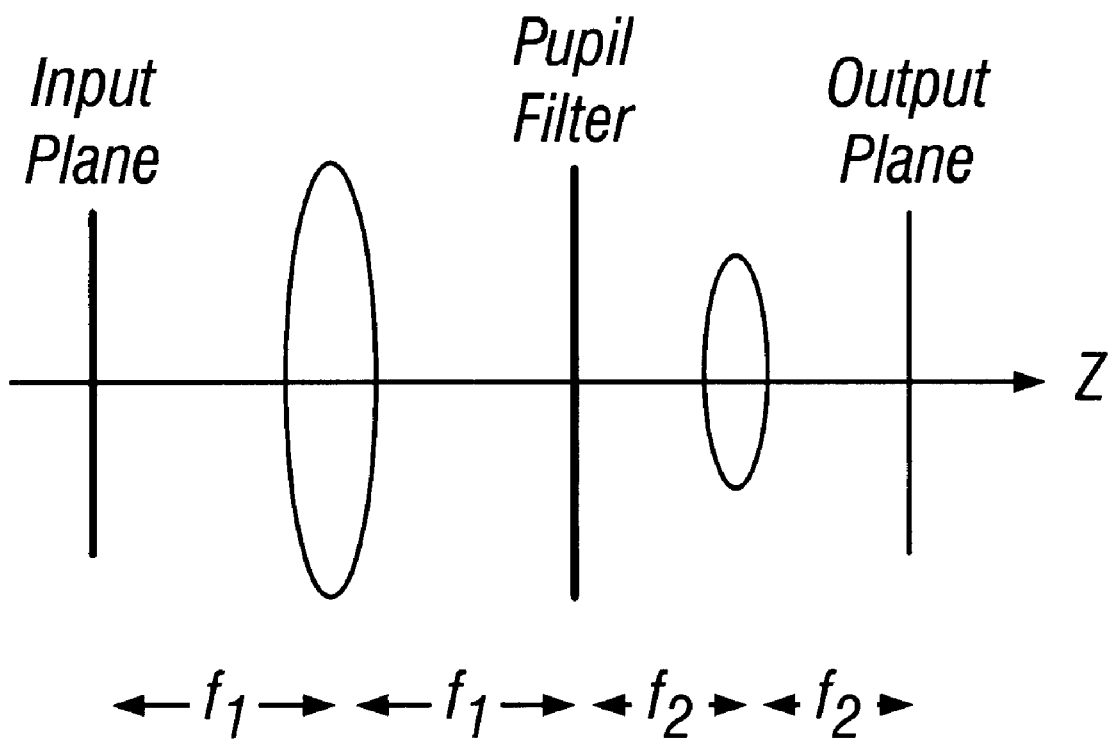
FIG. 4C shows the radial harmonic function displayed in the pupil plane.

Our last demonstration illustrates one possible application of the radial harmonic function as an element for increasing the depth of focus of an imaging system. Assume a telescopic imaging system. The radial harmonic function is displayed in its pupil plane (the spatial frequency plane), as is shown in FIG. 4c. As a result of increasing the system's depth of focus, the image is obtained in focus, and with the same size, along an axial interval equal to the extended depth of focus. If the radial harmonic function, with p=4, is chosen, the imaging system is substantially lossless. This contrasts favorably to some other pupil filtering methods which extend the depth of focus of an imaging system with significant losses. It should be also mentioned that the axicon and the other similar optical elements extend the depth of focus of an imaging system without losses. However, since each of them is basically a single lens imaging system, the size of the in-focus image changes along the depth of the field.

A second embodiment of the invention uses these features and functions to obtain a new result which is not anywhere suggested in the art. This result uses a focal line which has any arbitrary shape, but in this embodiment is represented by at least two connected straight line segments. Each of the straight line segments is implemented by a radial harmonic function in a different radial portion of the hologram. The twisting beam is made by creating small sword beams somewhere behind the lens. The present inventors have called this twisting curve of light a "snake beam".

Figure 14:
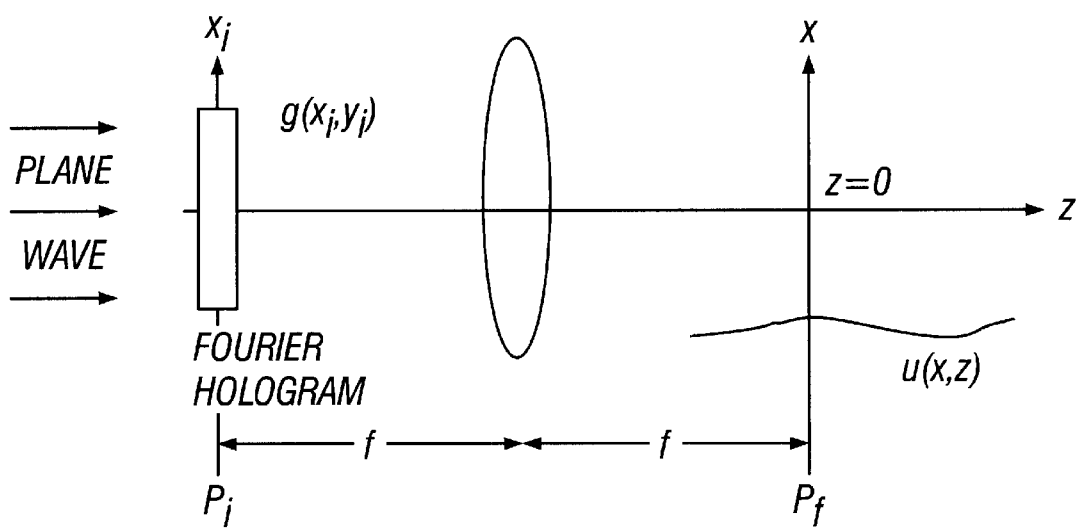
FIG. 14 shows a second embodiment of the invention that forms the "snake beam"

The basic layout is shown in FIG. 14. The plane wave is incident on the Fourier hologram and further processed as in previous embodiments. In this embodiment, however, the desired focal position is the function U(x,y,z). U can be any function, including a continuous curve. The inventors realized that there is a practical trade-off between the need to approximate the original curve with as large a number of straight lines as possible, and the accuracy of curve matching. The accuracy is also limited in resolution by the aperture diameter of the holographic mask. The length of each sword beam is proportional to the width of the radial portion and its radius $R_0$.

Figure 15A:
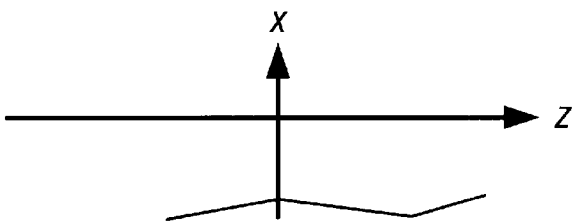
FIGS. 15a–c show how the snake beam is assembled.
Figure 15B:
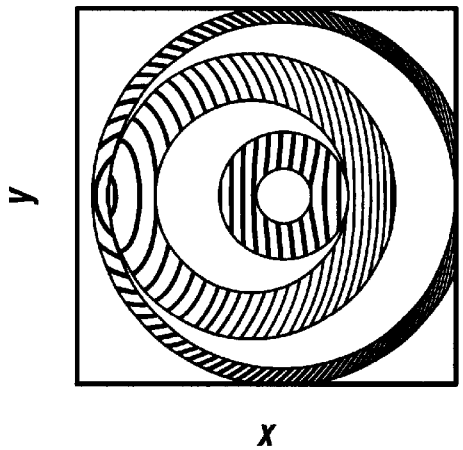

The system of this embodiment, therefore, starts by approximating the desired curve U(x, y, z) as straight lines as shown in FIG. 15a. The shortest line is implemented by the most internal radial portion of the hologram. This continues in increasing order, and finishes by implementing the longer line by the most external portion of the hologram. Each of these straight lines is a portion of the sword beam, also called a sub-sword beam.

Each sub-sword beam is characterized by four parameters: L its length, $h=(h_x,h_y)$ its lateral shift from the z axis, d its longitudinal shift (measured from the focal point to the beginning of the sword) and $\theta=(\theta_x,\theta_y)$ the tilt angle between the beam and the z axis. Each straight line in FIG. 15a has all its parameters recorded. These recorded parameters will be used to form the hologram. There are N sets of recorded parameters, one for each of the straight lines discussed above.

The overall hologram is implemented by forming N sub holograms for each of the N sub-sword beams. Preferably, a collection of N radial harmonic functions is implemented, each of which occupies one radial distance, laterally shifted by $(\alpha_n,\beta_n)$, multiplied by a linear phase with the parameters $(\xi_n,\eta_n)$ and multiplied by a quadratic phase with the parameter $\gamma_n$. The transparency distribution of the complete hologram is given by $$g(x_i, y_i) = \sum_{n=1}^{N} rect\left[\frac{\sqrt{(x_i - \alpha_n)^2 + (y_i - \beta_n)^2} - R_n}{\Delta R_n}\right] \quad (17)$$

$$\times \exp\left[j2\pi\left(\frac{([(x_i - \alpha_n)^2 + (y_i - \beta_n)^2])^2}{b^4} + \xi_n x_i + \eta_n y_i + \gamma_n r_i^2\right)\right]$$

where $$rect\left(\frac{x}{2\Delta}\right) \equiv \begin{cases} 1 & -\Delta \leq x \leq \Delta \\ 0 & \text{Otherwise} \end{cases},$$

$$R_n = \frac{b^2}{2f\sqrt{\lambda}}\sqrt{z_0 + \frac{L_n}{2} + \sum_{i=1}^{n-1} L_i} + \sum_{i=1}^{n}\text{MAX}\{|\alpha_n|, |\beta_n|\},$$

$$\Delta R_n = \frac{L_n b^4}{8\lambda f^2 R_n}, \quad z_0 = \frac{2\lambda f^2}{b^2}, \quad \gamma_n = \frac{d_n - \left(z_0 + \sum_{i=1}^{n} L_i\right)}{2\lambda f^2},$$

$$\xi_n = \frac{h_{x,n}}{\lambda f}, \quad \eta_n = \frac{h_{y,n}}{\lambda f}, \quad \alpha_n = f\tan\theta_{x,n},$$

and $\beta_n$=f tan $\theta_{y,n}$

All the above parameters are obtained by interpreting the above-discussed theorems and Eq. (17). It is desirable that all the parts of the hologram have the same value of the parameter b, in order to guarantee the same intensity level along the curve. The precise value of b may be determined such that on one hand it will not be too small in the sense that any local frequency somewhere over the hologram will not exceed the sampling rate of the computer's digital grid. On the other hand if b is too large, some radial portion of the RHF might not have enough cycles to justify the use of the stationary phase approximation. Eq. (17), with the definitions following it, tells us how to synthesize the hologram, and two examples are described next.

Figure 15C:
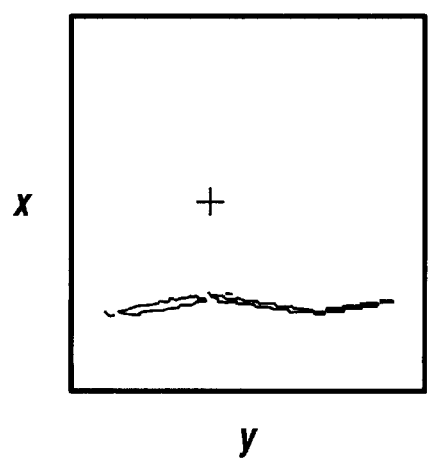

Using the parameters of FIG. 15a, the hologram was synthesized following the procedure of Eq. (17). The simulation results of this snake beam, using a Fresnel propagator, are shown in FIG. 15(c).

Although the overall beam is a collection of small sword beams, there is no restriction on the continuity or the order of these beams. Thus, one can create a more complicated 3-D patterns than just the simple snake beam. An example of such structure, which belongs to the class of tree-like focal lines is a three sword beam structure with one end of all three sword beams connected together.

These holograms may be implemented by grayscale phase masks, as described in Suleski and O'Shea, "Grayscale Masks for Diffractive Optics Fabrication", Applied Optics, V.34, P. 7507 (1995). Mutual shifts between the various elements on the mask cause intermediate opaque regions. It may be difficult to form such nontransparent regions on the phase mask. However, simulations run by the present inventors indicate that even if these regions were completely transparent (and thus the mask were a pure phase-only mask), the desired beam would still be obtained if it is located far away from the focus. That is because of the light which comes from the uniform intermediate regions concentrates into the focus.

The present inventors have demonstrated that snake beams can also be generated using real positive transparencies. The distribution of this hologram will be the real part of $g(x_i,y_i)$, given by Eq. (17), plus a constant term to prevent negative values in the hologram's function. As the case of an ordinary Fourier hologram, the resulting pattern contains 3 diffraction orders, in which the most intensive one concentrates at the front focus, while the two others contain the useful patterns. Therefore, in order to get an isolated fine structured snake beam, a proper separation, (laterally is preferred) between the diffraction orders is essential.

In conclusion, the techniques of the second embodiment allow an arbitrary twisting paraxial focal line to be obtained. One possible application of this concept is forming non-straight waveguides in the volume of photorefractive materials by an external illumination of these deformed beams.

Although only a few embodiments have been described in detail above, those having ordinary skill in the art will certainly understand that many modifications are possible in the preferred embodiment without departing from the teachings thereof. For example, the radial harmonic function could use a radius $R_2$ which is over parts of a radius, e.g., radius $R_1$, to $R_2$ rather than the whole radius.

All such modifications are intended to be encompassed within the following claims.

What is claimed is:

1. An optical system comprising:

a light focusing assembly, having a first end receiving light to be focused and a second end at which the light is focused, said light focusing assembly having an inherent place of focus for input light; and an input mask, located adjacent said first side of said light focusing assembly, said input mask altering light according to a predetermined function prior to its being introduced to said light focusing assembly, said predetermined function including a first element which alters a phase of the light to provide a pseudo-non-diffracting beam on the second side of said light focusing assembly according to a function, said function being a recorded version of a complex function, including a second element which changes said complex function to a real function which can be recorded on an optical element.

2. A system as in claim 1, wherein said input mask also has a third element which adjusts a position of the pseudo-non-diffracting beam relative to said inherent place of focus.

3. A system as in claim 2, wherein said function is a phase-only function.

4. A system as in claim 2, wherein said hologram comprises a function approximating specified functions without amplitude distribution.

* * * * *